Sept. 23, 1969  A. GERHARD  3,468,091
WALL FASTENERS
Filed Dec. 12, 1967  2 Sheets-Sheet 2
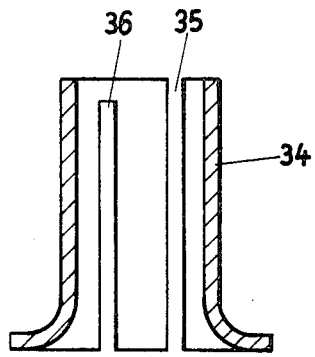
Fig.6
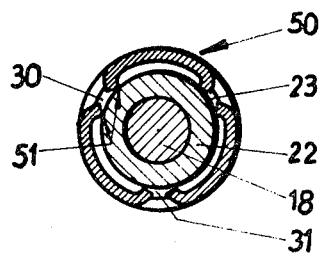
Fig.7
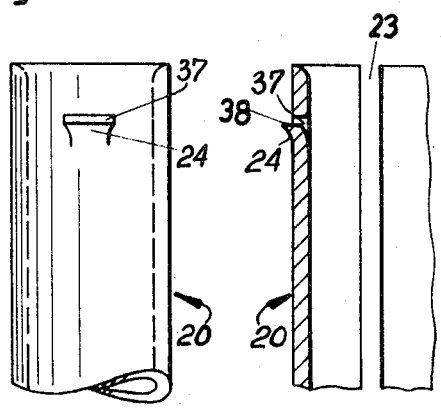 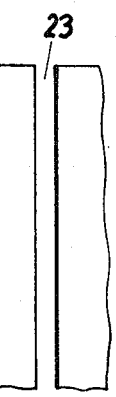
Fig.8  Fig.9
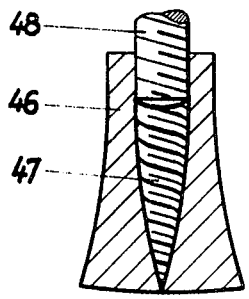
Fig.10
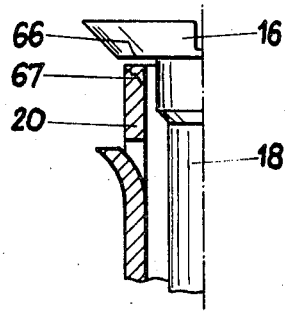
Fig.11
INVENTOR
ANTON GERHARD
By: Stemberg + Blake
Attys

United States Patent Office 3,468,091
Patented Sept. 23, 1969

3,468,091
WALL FASTENERS
Anton Gerhard, 37 Peyerstrasse,
8500 Nuremberg, Germany
Filed Dec. 12, 1967, Ser. No. 689,978
Claims priority, application Germany, Dec. 14, 1966,
G 48,733
Int. Cl. E04b *1/16;* F16b *13/04, 33/04*
U.S. Cl. 52—378                    9 Claims

ABSTRACT OF THE DISCLOSURE

Wall fasteners for fastening structures to masonry walls, for example. The fastener includes an elongated bolt having a shank which is threaded at least in the region of one end of the bolt and having an enlarged head at the opposite end of this shank, the shank being surrounded by an elongated sleeve which is longitudinally slotted along at least part of its length and which terminates in one end face which is directed toward and adjacent the bolt head and in an opposed end which is in the region of the threaded end of the shank. This threaded end of the shank carries a nut provided with a tapered exterior surface extending into the sleeve. The outer diameter of the sleeve is greater than the largest outer diameter of the nut, while the diameter of the bolt head is greater than the outer diameter of the sleeve. The sleeve has at least one projection extending outwardly beyond its exterior surface and terminating in an end face which is directed toward the bolt head, so that this projection may engage the inner surface of a structural element whose outer surface is engaged by the bolt head, with the nut together with the shank portion and sleeve adjacent thereto received in a bore of a masonry wall with the part of the sleeve which extends forwardly beyond the projection thereof toward the bolt head extending into an opening in the structural element which is to be carried by the masonry wall.

BACKGROUND OF THE INVENTION

The present invention relates to fasteners for fastening structural components to masonry walls and the like.

Thus, the present invention relates to that type of fastener which includes an elongated threaded bolt having a head at one end and surrounded by a sleeve which is at least partially slotted, the threaded end of the shank of the bolt carrying a tapered nut which extends into an end of the sleeve.

With known structures of this general type, the entire device must first be mounted before it is introduced into the masonry wall or into the structure which is to be connected thereto, so that advantageous modern methods of mass production with respect to the assembly of the device cannot be used. Moreover, resistance to sheer and bending of the known structures are only relatively small, because the sleeve does not extend all the way up to the head of the bolt, and therefore cannot absorb such stresses which instead must be absorbed exclusively by the shank of the bolt.

Also, the known structures do not enable the mounting to be carried out in such a way that, for example, a structural element can be situated at a predetermined distance from a wall or the like on which it is mounted.

SUMMARY OF THE INVENTION

It is accordingly a primary object of the present invention to provide a device of the above general type which will avoid the above drawbacks.

Thus, it is an object of the invention to provide a device of the above type which can take full advantage of mass production techniques, which will indeed utilize the sleeve to absorb sheering and bending forces, and which can mount a structural element at a predetermined distance from a supporting structure such as a masonry wall.

Thus, in accordance with the invention the fastener assembly, which can be used for fastening a structure to a masonry support or the like, includes an elongated fastener bolt having an elongated shank which is threaded at least in the region of one end and which has at its other end an enlarged head of a diameter greater than that of the shank. An elongated tubular sleeve surrounds the shank of the bolt and has one end directed toward and located adjacent a rear end face of the bolt head which is directed toward the threaded end of the shank, this sleeve having an opposed end in the region of the threaded end of the shank. The sleeve is longitudinally slotted at least along part of its length. A nut which has a tapered exterior surface is threaded onto the shank at the end of the sleeve which is distant from the bolt head, and this nut extends into the sleeve and has a maximum outer diameter which is smaller than the exterior diameter of the sleeve while the bolt head has a diameter greater than the exterior diameter of the sleeve. Because one end of the sleeve is adjacent the rearwardly directed surface of the bolt head, the sleeve is capable of absorbing sheering and bending forces. The sleeve is provided at its exterior with at least one projection having an end surface situated outwardly beyond the exterior surface of the sleeve and directed toward the bolt head, and this end surface of the projection is adapted to engage an inner surface of a structural element which is directed toward the masonry wall which carries the structural element, so that in this way the structural element can be situated at a predetermined distance from the masonry wall.

BRIEF DESCRIPTION OF DRAWINGS

The invention is illustrated by way of example in the accompanying drawings which form part of this application and in which:

FIG. 6 is a longitudinal sectional elevation of a reducing sleeve of FIG. 5, shown in FIG. 6 on an enlarged scale as compared to FIG. 5, the plane of FIG. 6 containing the axis of the reducing sleeve illustrated therein;

FIG. 7 is a transverse section of another embodiment of a fastener of the invention showing a structure for reducing the inner dimensions of the sleeve;

FIG. 8 is a front elevation of part of a sleeve of the invention provided with a projection according to the invention;

FIG. 9 is a longitudinal sectional elevation of the structure of FIG. 8 fragmentarily illustrating further details of the projection;

FIG. 10 is a longitudinal sectional elevation of another embodiment of a nut which can coact with the threaded end of the shank of a bolt of the invention; and FIG. 11 shows another embodiment of a bolt head structure for coacting with the sleeve of the invention.

DESCRIPTION OF PREFERRED EMBODIMENTS

Figure 1:
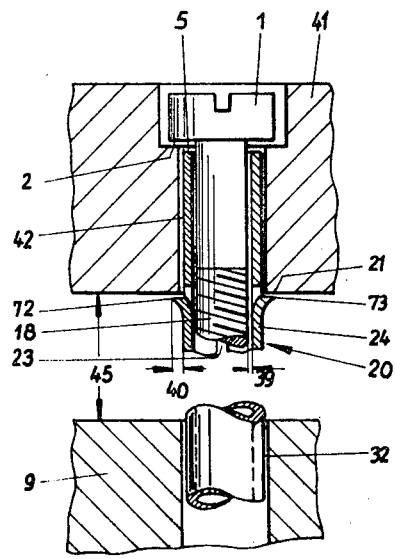
FIG. 1 is a fragmentary sectional plan view of one possible embodiment of a fastener structure of the invention, the section of FIG. 1 being taken in a plane which contains the axis of the bolt, and a fastener of the invention being shown in FIG. 1 in a position mounting a structural element on a masonry wall.

Referring now to FIG. 1, there is shown therein a fastener of the invention which includes a bolt having a bolt head 1 provided with a rearwardly directed annular surface 2 which is flat and situated in a plane normal to the axis of the shank 18 of the bolt. This shank 18 is surrounded by a sleeve 20 of the fastener, this sleeve 20 being made of a springy metal and having opposed open ends. One end 5 of the sleeve 20 is located immediately adjacent and directed toward the flat rear surface 2 of the bolt head 1 while the opposed end of the sleeve which is not illustrated in FIG. 1 is situated in the region of the threaded end of the shank 18.

FIG. 1 illustrates the structural element 41 which is mounted at a predetermined distance 45 from the masonry wall 9 or the like to which the structural element 41 is to be fastened. In order to situate the structural element 41 at the predetermined distance 45 from the wall 9, the sleeve 20 is provided with a pair of opposed projections 24 respectively having end surfaces directed toward the bolt head and engaging the rearwardly directed surface of the element 41 so as to determine the location thereof with respect to the wall 9. The structural element 41 may, for example, take the form of an understructure for carrying an outer wall covering which will thus be situated at a given distance in front of the masonry wall 9. The structure 41 is clamped between the rear surface 2 of the bolt head 1 and the front end faces of the projections 24.

Figure 2:
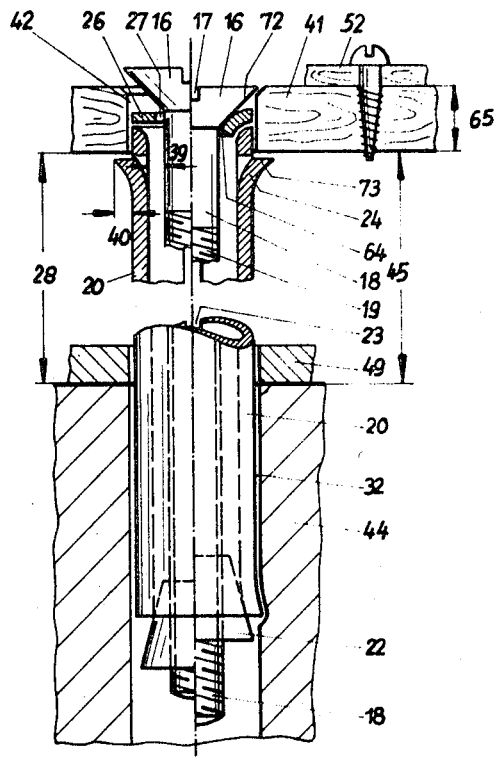
FIG. 2 is a fragmentary sectional plan view also schematically illustrating another embodiment of the invention, the section of FIG. 2 being taken in a plane which contains the axis of the bolt, and the structure is shown in FIG. 2 on the left side of the bolt axis in the position it takes before the bolt is tightened while on the right side of the bolt axis the structure is shown after the bolt has been turned so as to draw the fastener up tightly.

The fastener which is shown in FIG. 2 includes a bolt head 16 provided at its front face with a transverse slot 17 to receive the tip of a screwdriver and having a rearwardly directed tapered surface forming part of a cone. The shank 18 extends rearwardly from and is integral with the bolt head 16 and is provided distant from the bolt head 16 with threads 19 which extend up to the free end of the shank along a length of approximately two thirds of the total shank length, the rest of the shank having a smooth exterior surface of cylindrical configuration between the thread 19 and the bolt head 16.

The shank 18 of FIG. 2 is also surrounded by a sleeve 20 which extends substantially from the rear tapered surface 72 of the bolt head 16 up to the region of the opposed end of the shank 18 where the latter extends threaded through a nut 22 having an exterior tapered surface forming part of a cone and extending into the interior of the sleeve 20. The sleeve 20 is provided with a longitudinal slot 23 extending parallel to the axis of the sleeve 20 along the entire length thereof so that the sleeve 20 is capable of resilient radial compression and expansion transversely with respect to its axis.

At the region of the head end of the bolt the sleeve 20 is provided with the outwardly struck projections 24 which are integral with the sleeve 20, being struck outwardly from the material thereof, although, if desired, the projections 24 may take the form of separate components fixed to the exterior of the sleeve 20.

The end 5 of the sleeve 20 which is adjacent the bolt head 16 is inwardly rounded, as indicated at the inner circular bevelled surface 25 of the sleeve 20.

In this embodiment of the invention a washer 26 is situated between the surface 25 and the bolt head 16, this washer 26 having an exterior diameter corresponding to the outer diameter of the sleeve 20 in the unstressed condition of the latter. The inner diameter of washer 26, or in other words the diameter of the opening 27 thereof, is approximately as great as the diameter of the shank 18 of the bolt. The thickness of the washer 26 is selected in such a way that during turning of the bolt 16, 18 to pull the nut 22 toward the head 16 the end surface 25 of the sleeve 20 and the tapered surface 72 of the bolt head 16 deform the washer 26 so as to curve it inwardly at its inner periphery and thus provide the washer 26 with a rearwardly directed surface 64, so that the rear surface of the washer will conform closely to and substantially engage the entire area of the inner bevelled surface 25 at the end 5 of the sleeve 20.

Figure 3:
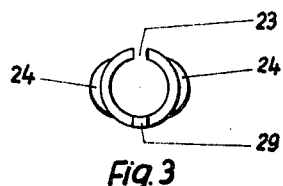
FIG. 3 is a top plan view of the sleeve of FIGS. 1 and 2 as seen when looking downwardly onto the end of the sleeve which is directed toward the bolt head.
Figure 4:
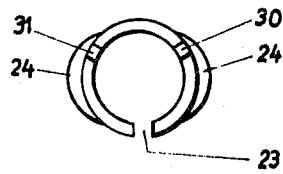
FIG. 4 is a plan view of the sleeve of FIGS. 1 and 2 as seen when looking toward the end thereof which is situated in the region of the threaded end of the bolt shank.

As is indicated in FIG. 3, the sleeve 20 can be provided at the region of its end 5 with a longitudinally extending slot 29 displaced by 180° from and situated directly opposite the longitudinal slot 23 which extends along the entire length of the sleeve, this slot 29 having a closed end situated at a given distance from the end 5 and an open end at the end 5 of the sleeve 20. Moreover, as is indicated in FIG. 4, the opposed end of the sleeve 20 is provided with a pair of slots 30 and 31 similar to the slot 29, extending approximately along one third of the length of the sleeve and having open ends at the end of the sleeve which is situated at the nut 22. As is apparent from FIG. 4 the slots 23, 30 and 31 are equally distributed circumferentially about the axis of the sleeve while extending parallel to this axis.

The nut 22 is formed with a tapped bore which extends completely through the nut so that the shank 18 extends through and beyond the nut, thus preventing particles of foreign matter from having access to the threads of the nut.

Figure 5:
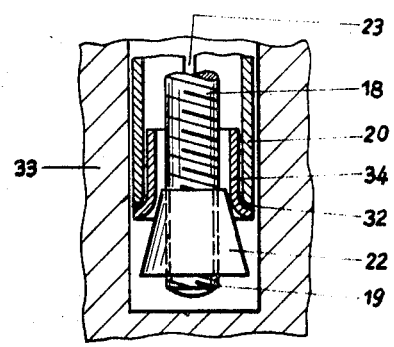
FIG. 5 is a fragmentary sectional plan view taken in a plane which contains the bolt axis and showing an embodiment which enables the inner surface of the sleeve to be reduced so as to accommodate a nut having a relatively small exterior surface.

In order to provide the sleeve 20 at the region of the nut 22 with an inner dimension smaller than the inner dimension of the sleeve 20 at the region of the head 16 of the bolt, a reducing sleeve 34 may be situated in the end of the sleeve 20 where the nut 22 is located, as indicated in FIG. 5. This reducing sleeve 34 has an elongated cylindrical portion situated in the interior of the sleeve 20, and the sleeve 34 terminates in an outwardly flaring end which conforms to the curvature of the inner bevelled surface 33 of the end of the sleeve 20 which surrounds the reducing sleeve 34. Thus, it will be seen that the exterior curved surface of the sleeve 34 conforms to the curvature of the inner curved end surface 33 of the sleeve 20. As may be seen from FIG. 6, the sleeve 34 is provided with an axially extending slot 35 which extends along the entire length of the sleeve 34 and with a second axially extending slot 36 which does not extend completely along the entire length of the sleeve 34 but which has an open end at the outwardly flaring end of the sleeve 34.

It is more advantageous, however, to provide the sleeve with a construction as illustrated in FIG. 7. As may be seen from FIG. 7, the sleeve 50 which corresponds to the sleeve 20 is provided at the region of its end which surrounds the nut 22 with the slots 23, 30 and 31 as described above in connection with FIG. 4. However, at this end region of the sleeve 50 the elongated edge portions 51 which define the slots 23, 30 and 31 at the portion of the sleeve 50 which surrounds the nut 22 are inwardly curved so that the slots have in engagement with the nut 22 inwardly directed edges 51 which extend at least substantially parallel to the axis of the shank 18 of the bolt. In this way it is possible to achieve the same effect as that which is achieved by the sleeve 34, namely a much smaller extent of movement of the nut 22 along the shank 18 until the nut 22 achieves the desired spreading action. Without the reducing sleeve 34 or the inwardly curved edges 51 the nut 22 would have to be displaced along a considerably greater distance before achieving the desired spreading action. The structure of FIG. 7 as well as the structure of FIG. 5 can be used for anchoring the fastener in hard as well as soft masonry.

Referring now to FIG. 2, the radial distance 39 between the exterior surface of the shank 18 and the inner surface of the sleeve 20, and the transverse width of the slot 23, are at least as great in the unstressed condition of the sleeve 20 as the distance 40 through each projection 24 extends outwardly beyond the exterior surface of the sleeve 20. Thus, the limiting projections 24 are rigid with respect to the exterior surface of the sleeve 20 and do not yield resiliently with respect thereto. On the other hand, the springy material of the sleeve 20 and the slots 23 and 29 are selected in such a way that the sleeve 20 can yield through the radial distance 39 with respect to the shank 18, and thus it is possible during such radial compression of the sleeve 20 for the projections 24 to pass through the opening 42 of the structural element 41.

As may be seen from FIG. 2, the structural component 41 which is to be fastened with the structure of the invention has the bore 42 thereof initially of a cylindrical configuration, before the bolt of the fastener is tightened and the diameter of the bore 42 corresponds substantially to the exterior diameter of the sleeve 20 in the unstressed condition of the latter.

After the bolt 16, 18 of the fastener is tightened, the outer end of the bore 42 of the element 41 is formed with a tapered countersink against which the tapered surface 72 of the bolt head 16 is seated at the region of the front outer face of the bolt head 16, this front outer face then being flush with the exterior front surface of the component 41. When the slot 17 for the tip of the screwdriver is formed, a burr will remain at one end of the slot 17 projecting beyond the bolt head, and this burr is advantageously used during tightening of the bolt so as to provide the component 41 with the countersink. For this reason it is also of advantage to provide the screwdriver slot 17 with a depth along the axis of the shank 18 which is greater than the depth of the countersink against which the surface 72 is seated. However, if desired, it is possible to situate at the rear surface of the bolt head a special element to provide the countersink in the component 41, or the countersink may be manufactured in a conventional manner with the use of a countersink tool. The countersink will be formed in this latter manner particularly in the case where the structural component 41 is made of a relatively hard material.

FIG. 2 illustrates the masonry wall 44 or the like on which the component 41 is mounted and fastened by the structure of the invention, this wall 44 corresponding to the wall 9 of FIG. 1. The distance 28 between the inner surface of component 41 and the front outer surface of wall 44 is the distance at which the component 41 is initially positioned with respect to the wall 44, and after the fastener of the invention has been introduced into the position shown at the left of the fastener axis in FIG. 2 and has been tightened upon turning of the bolt 16, 18, the distance 45 between the front surface of the supporting wall 44 and the inner surface of the component 41 precisely equals the distance 28, so that the position of the component 41 is precisely fixed and does not change upon tightening of the fastener of the invention.

In the example shown in FIG. 5 the nut 22 is made of steel so that a particularly great tightening force can be provided. It is also possible, however, to make the nut of aluminum. If for certain purposes, however, a relatively small tightening force is sufficient, then the nut may be made of plastic and can have a construction as shown for the nut 46 in FIG. 10. In this case the nut 46 still has an exterior tapered surface which extends into the sleeve 20, but the end 48 of the shank of the bolt does not extend completely through the nut. Instead the nut 46 has a closed end situated beyond the threaded end 48 of the shank, and the threaded interior 47 of the nut is tapered as illustrated in FIG. 10. Thus, as the threaded end 48 of the shank advances axially into the nut 46, while the latter is drawn onto the shank toward the head end thereof, the nut 46 will be radially expanded so that with this construction it is possible to eliminate under certain circumstances a structure such as the reducing sleeve 34 of FIG. 5.

In most cases, as indicated in FIG. 2, the exterior front surface of the masonry wall 44 will be provided with a layer of insulation 49.

As is well known, the exterior supporting structure 41 will initially be situated at a predetermined distance in front of the masonry wall 44 after having been properly leveled and after having been precisely positioned so as to extend vertically, for example, by the use of suitable spacer slats and plumb lines and bobs arranged at edges of the construction. In this way the position of the understructure 41 will be precisely determined. This understructure 41 may, for example, be made of Eternit, a trade name for a form of asbestos cement material. The distance 28 between the masonry wall 44 and the structure 41 can vary in accordance with the lack of evenness at the exterior surface of the wall 44, or the wall 9 in FIG. 1. However, with this construction the exterior forwardly directed surface of the structure 41 will be perfectly flat and vertical so that in this way a suitable surface is provided on which the covering face plates 52 of the structure may be fastened as shown in FIG. 2.

After thus determining the position of the structure 41 and forming the coaxial bores 42 and 32, the entire assembled fastener of the invention, including the bolt, the sleeve, the nut, the washer 26, if the embodiment of FIG. 2 is used, and the sleeve 34 if the embodiment of FIG. 5 is used, or in place of the sleeve 34 the structure of FIG. 7 having the inwardly directed edges 51, is introduced in its completely assembled condition with the nut 22 leading first through the opening 42 of component 41 and then the assembly is pushed into the opening 32 of the wall 44, or the wall 9. The projections 24 will simply snap behind the inner surface of the component 41. Then the bolt is tightened until the sleeve 20 is spread against the inner surface of the wall 9 or 44 which defines the bore 32 which has been previously formed therein. The component 41 will simply be clamped between the bolt head and the projections 24. Thus, with the structure of the invention, as shown in FIGS. 1 and 2, the fastener is in its entirely assembled condition when it is introduced into the bores for the purpose of fixedly mounting an element such as component 41 on an element such as wall 9 or 44 at a given distance therefrom.

It is to be noted in connection with FIG. 5, that at the nut end of the assembly, the nut 22, the reducing sleeve 34, and the sleeve 20 are initially in engagement with each other without any tightening of the bolt when the assembly is introduced into the bore 32. Now when the bolt 16, 18 is tightened the nut 22 will advance axially along the shank 18 toward the head of the bolt, as shown at the right of the bolt axis in FIG. 2, and at the same time the head of the bolt will advance rearwardly into the opening 42 in the manner which is also indicated at the right of the bolt axis in FIG. 2. As a result the washer 26 is deformed as described above and the sleeve 20 at the region of its end 5 will be radially expanded into engagement with the surface which defines the bore 42 so as to tightly press against the component 41. As a result the axial position of the component 41 is precisely determined.

Inasmuch as the sleeve 20 at its region which surrounds the nut is also expanded into engagement with the surface which defines the opening 32, the sleeve is fixed with respect to the masonry wall 44 so that during the tightening of the bolt the wall of the sleeve 20 can only be expanded radially.

It is easily possible to change a device which has been set in the manufacturing plant to a given distance between the head of the bolt and the projections 24, which is to say for a given thickness 65 of the component 41, by threading the bolt 16, inwardly or outwardly either before or after the fastener assembly is introduced, so that the structure is highly flexible and has a very wide variety of applications. If this change is carried out after the device has been introduced into the openings and if the distance between the bolt head and projections 24 is too small, then no particular harm will occur because the projections 24 will simply dig into the material of the component 41 and will in this way fixedly position the latter.

In the case where a washer 26 is not used and the end 5 of the sleeve 20 directly engages the tapered rear surface 72 of the bolt head 16, the engagement between the end 5 of the sleeve 20 with the tapered surface 72 of the bolt head will oppose resilient radially inward compression of the sleeve 20 when the projections 24 extend into the opening 42. Thus, in this case the bolt is initially unthreaded to such an extent that the rear end of the sleeve 20 which initially surrounded the nut, is instead located in a position surrounding the shank 18 in the region of the nut, so that the sleeve 20 will in this case not have its inward radial compression resisted by the nut, and thus in this case even if the end 5 of the sleeve 20 engages the rear surface of the head 16 it will still be possible for the sleeve to resiliently yield inwardly. Thus it becomes possible to provide a structure which does not have a washer. However, in this case there is the disadvantage that the distance between the rear surface of the bolt head and the nut must be made at least great enough to accommodate the entire length of the sleeve so that it is essential to provide in this case a shank which is long enough to be unthreaded from the nut to an extent sufficient to accommodate the sleeve between the nut and the bolt head. Also, there is the disadvantage of requiring a longer installation time as a result of the required turning of the bolt.

The use of a washer 26 is preferred, however. For example, if during introduction of the sleeve into the opening of the masonry wall the fastener assembly of the invention encounters a resistance so that it must be hammered into position, then if there is no washer 26 it can easily happen that the spreading clamping action between the end 5 of the sleeve 20 and the component 41 will take place too soon so that the component 41 might be undesirably displaced toward the supporting masonry wall 9 or 44 during the continued hammering of the fastener into position, and of course such a result is completely undesirable so that this latter undesirable result will be avoided by the use of a washer 26.

However, it is to be understood that the use of a washer 26 is not the only way to solve this problem and is not absolutely essential to avoid this latter drawback. It is possible to use at the rear of the bolt head any structure which will provide after assembly of the device of the invention an annular surface which is capable of being deformed so as to take the tapered configuration of the rear surface of the bolt head after the bolt is tightened.

This result may be achieved, for example, also by a structure as shown in FIG. 11 where the head end of the sleeve 20 is initially flat and situated in a plane normal to the axis of the sleeve while the bolt head 16 is in this case provided with a rearwardly directed flat surface portion 66 situated in a plane normal to the bolt axis. Thus, if it is necessary to hammer this assembly into position, the flat surface 66 will simply engage the flat end surface of the sleeve 20 which is directed toward the surface 66, and the entire assembly can be driven into position without undesirable premature expansion of the sleeve 20. In this case it will only be upon tightening of the bolt 16, 18 that the sleeve 20 will be radially expanded so that the inner edge of its initially flat head end face will be deformed to the tapered configuration 67 shown in FIG. 11, corresponding to the tapered exterior periphery of the bolt head 16 and pressing against this tapered periphery to achieve the results of the invention. Thus, during the turning of the bolt and the expansion of the sleeve 20 the bolt head will deform and frictionally rub against the inner peripheral surface of the head end of the sleeve 20 to provide this head end with the configuration 67 matching the taper at the outer periphery of the bolt head 16. Thus, with this construction it is also possible to prevent an initial premature undesirable expansion of the sleeve 20 while achieving thereafter upon turning of the bolt the desired rate of expansion and deformation at the end of the sleeve 20 which engages the bolt head.

As was indicated above, if it should happen that with an assembly of the invention, with or without a washer, the distance between the bolt head and the projections 24 is too small, then these projections 24 will simply dig into the wall of the component 41 which defines the bore 42 thereof and thus the position of the component 41 will also be determined in this way. However, particularly in the case where the component 41 is made of hard material the forces taken up by the shank 18 longitudinally thereof are not particularly great. Thus, in this latter event where the component 41 is made of a hard material the projections 24 can simply rest against the inner surface of the component 41 which is directed toward the supporting masonry wall, as shown in FIG. 2. Thus, the device of the invention is particularly suited for mounting of understructure components made of relatively hard material such as, for example, Eternit.

Thus, as a practical matter during the assembly of the device of the invention the distance between the rear surface of the bolt head and the projection 24 can always be maintained equal and can correspond to that thickness of the understructure 41 which is the maximum thickness thereof which is to be fastened with the structure of the invention. With such a construction the projections 24 will in all cases pass completely through the bore of the component 41 and then it will only be necessary to turn the bolt further.

It is also possible, however, to select the distance between the bolt head and projections 24 in such a way that they correspond to that thickness which is most frequently encountered in practice, and in this case it will only be necessary to thread the bolt further into or further out of the nut before the entire assembly is introduced, so as to accommodate the distance between the bolt head and the projections to one which is not so frequently encountered, if necessary.

Actually, the maximum thickness of the component 41 is adapted to that which is most frequently encountered in practice, so that with a tool which manufactures the projctions 24 and with a sleeve interior diameter of 10 mm., for example, the distance between the bolt head and projections 24 of, for example, 10 mm. is set, and in this case the assembly of the invention will be used with those structural components 41 which are most frequently encountered in practice without requiring any change in the position of the bolt before the assembly is introduced through the opening of the component 41 and into the opening of the masonry wall.

As was indicated above it is possible to use the plastic nut structure of FIG. 10 instead of a reducing sleeve or inwardly directed edges 51 shown in FIG. 7, so that during tightening of the bolt this nut will itself expand to provide the required expansion of the sleeve 20 even though the distance between the exterior surface of the shank 18 and the inner surface of the sleeve 20 must be made relatively great to achieve the required yieldable radial compression and expansion through the distance 39 shown in FIG. 2. Of course, the reducing sleeve 34 and the inwardly curved edges 51 will also enable the required relatively large radial yielding of the sleeve to be achieved while at the same time providing for the nut a relatively small extent of axial displacement before the expanding action is achieved. Of course, it would be possible simply to provide the sleeve 20 at the region of the nut 22 with an inner diameter smaller than the remainder of the sleeve 20 so that the wall of the sleeve 20 would be thicker at the region of the nut 22, but a construction of this latter type would render the device too complicated and too expensive to manufacture.

It is to be noted that when the device of the invention is used in relatively hard stone or the like, the spreading action achieved by the nut 22 is in itself sufficient to provide the required mounting of the fastener in the masonry wall, but in the case of relatively soft masonry wall structure the spreading action achieved by the tapered nut will not in and of itself be sufficient, so that the additional expansion achieved by the sleeve 34 or the edges 51 of FIG. 7 contribute to the efficiency of the structure in this latter case. On the other hand, the reducing sleeve 34 or the edges 51 do not in any way interfere with the desired anchoring of the device in hard materials, so that it is advantageous to provide the structure of the invention in all cases with a structure such as a reducing sleeve 34 or the inwardly directed edges 51 of FIG. 7, so that such a construction will have a wide range of utility in materials of all degrees of hardness.

What is claimed is:

1. In combination, a fastener assembly fastening a structure which has a bore of a given diameter passing therethrough to a masonry support or the like, at a location in front of and spaced from said support with said bore of said structure coaxial with a bore extending into said masonry support, said fastener comprising an elongated fastener bolt having an elongated shank which is threaded at least in the region of one end of said shank and which has at the other end of said shank an enlarged head of a diameter greater than that of said shank, an elongated tubular sleeve surrounding said shank, having one end directed toward and located adjacent a rear end face of said bolt head which is directed towards said threaded end of said shank and having an opposed end in the region of said threaded end of said shank, and a nut having a tapered exterior surface and threaded onto said shank at the end of said sleeve which is distant from said bolt head, said nut extending into said sleeve and having a maximum outer diameter smaller than the exterior diameter of said sleeve while said bolt head has a diameter greater than exterior diameter of said sleeve, said sleeve being provided at its exterior at the region of but spaced from said one end of said sleeve with a pair of opposed projections respectively having end surfaces situated outwardly beyond the exterior surface of said sleeve and directed toward said bolt head, and said sleeve being formed with a plurality of slots extending axially therealong, situated at the opposed ends of said sleeve, and including at least one slot which extends longitudinally of said sleeve along the entire length thereof, said sleeve being made of a springy material and having an inner surface extending around the exterior surface of said shank with a clearance sufficiently great for said sleeve to be circumferentially contracted at least at said one slot which extends along the entire length thereof to an extent displacing the inner surface of said sleeve toward said shank radially by a distance sufficiently great for said projections to pass through said bore of said structure to be situated, upon expansion of said sleeve back to initial condition, at a rear surface of said structure which is directed toward the masonry support and with the part of said sleeve extending from said projections to said one end thereof extending into the bore of the structure for guiding and supporting the latter so that after the sleeve, bolt, and nut are assembled, they can be introduced through the bore of the structure into the bore of the masonry support with said projections engaging the rear surface of the structure which is directed toward the masonry support.

2. The combination of claim 1 and wherein a washer is situated between said bolt head and the end of said sleeve which is adjacent thereto, said washer closely surrounding said shank and said bolt head having directed toward said washer a tapered rear surface capable of deforming said washer at the region of its inner periphery into said sleeve during pulling of said nut and sleeve toward said bolt head upon turning of said bolt.

3. The combination of claim 1 and wherein said nut is formed with a tapped bore extending completely therethrough and said shank of said bolt extending completely through and beyond said nut so that particles of foreign matter cannot have access to the interior of said nut.

4. The combination of claim 1 and wherein said nut is made of a plastic material and terminates beyond the threaded end of said shank in a closed end, said nut having a threaded interior which tapers beyond said threaded end of said shank and becomes gradually smaller toward said closed end of said nut so that during pulling of the latter onto said shank said nut will expand.

5. The combination of claim 1 and wherein projections are integral with said sleeve and in the form of tongues struck outwardly from a wall portion of said sleeve.

6. The combination of claim 1 and wherein said head of said bolt has a flat rear surface initially engaging said one end of said sleeve and said head of said bolt having a frustoconical surface surrounding and extending from said flat rear surface thereof, so that after transmission of axial forces from said head to said sleeve through said flat rear surface of said head to situate said sleeve at its required axial position, the turning of said bolt to displace the nut against said opposed end of said sleeve will result in outer expansion of said sleeve with said one end thereof engaging said frustoconical surface of said bolt head.

7. The combination of claim 1 and wherein said sleeve has in the region of said nut an inner dimension smaller than the inner dimension of said sleeve in the region of said bolt head.

8. The combination of claim 7 and wherein said sleeve includes in the region of said nut a tubular insert providing said sleeve with said inner smaller dimension.

9. The combination of claim 7 and wherein said sleeve has in the region of said nut at least one longitudinally extending slot defined between a pair of edges of wall portions of said sleeve which are curved inwardly toward the axis of said sleeve to provide the latter with said inner smaller dimension.

References Cited

UNITED STATES PATENTS

| 1,161,155 | 11/1915 | Pleister | 85—85 |
| 2,052,793 | 9/1936 | Peirce | 85—74 |
| 2,435,876 | 2/1948 | De Swart | 85—74 |
| 2,762,119 | 9/1956 | Jackson | 85—85 |

FOREIGN PATENTS

| 208,769 | 12/1955 | Australia. |
| 664,262 | 9/1965 | Belgium. |
| 505,145 | 4/1920 | France. |
| 510,113 | 8/1920 | France. |
| 1,208,535 | 2/1960 | France. |
| 1,458,166 | 5/1965 | France. |
| 300,088 | 11/1928 | Great Britain. |
| 873,980 | 8/1961 | Great Britain. |
| 899,225 | 6/1962 | Great Britain. |
| 531,824 | 8/1955 | Italy. |
| 543,508 | 5/1956 | Italy. |
| 6,502,064 | 9/1965 | Netherlands. |
| 254,174 | 8/1949 | Switzerland. |

MARION PARSONS, JR., Primary Examiner

U.S. Cl. X.R.

52—713; 85—74, 80